(12) United States Patent
Morales et al.

(10) Patent No.: US 11,669,141 B2
(45) Date of Patent: Jun. 6, 2023

(54) COMPUTING SYSTEM INCLUDING POWER NODES

(71) Applicant: Microsoft Technology Licensing, LLC, Redmond, WA (US)

(72) Inventors: Osvaldo Patricio Morales, Key West, FL (US); Michael P Czamara, Leavenworth, WA (US); Judith Ying Priest, Palo Alto, CA (US); Adolfo Bravo Ferreira, Poulsbo, WA (US); Scot Edward Heath, Issaquah, WA (US); Kevin Carter Keaney, Media, PA (US); Shashank Gupta, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 64 days.

(21) Appl. No.: 17/334,371

(22) Filed: May 28, 2021

(65) Prior Publication Data

US 2022/0382352 A1 Dec. 1, 2022

(51) Int. Cl.
*G06F 1/30* (2006.01)
*G06F 1/28* (2006.01)
*H04L 12/10* (2006.01)

(52) U.S. Cl.
CPC .............. *G06F 1/30* (2013.01); *G06F 1/28* (2013.01); *H04L 12/10* (2013.01)

(58) Field of Classification Search
CPC .............. G06F 1/30; G06F 1/28; H04L 12/10
See application file for complete search history.

(56) References Cited

U.S. PATENT DOCUMENTS 6,741,442 B1 5/2004 Mcnally et al.
7,099,784 B2 8/2006 Spitaels et al.
(Continued)

FOREIGN PATENT DOCUMENTS

CN 107465166 B 9/2020

OTHER PUBLICATIONS

Al-Hazemi, Fawaz, "PDMDC: A Power Distribution Manager for Cloud Environment Data Centers", In Proceedings of 24th International Conference on Software, Telecommunications and Computer Networks, Sep. 22, 2016, 5 Pages.
(Continued)

*Primary Examiner* — Aurel Prifti
(74) *Attorney, Agent, or Firm* — Alleman Hall Creasman & Tuttle LLP (57) ABSTRACT

Examples are disclosed that relate to computing systems having a common conductive pathway. One example provides a computing system comprising a power supply configured to output electrical power for delivery to one or more power nodes, and one or more power monitors configured to identify a power overload condition based on the power output by the power supply. The computing system further comprises a parent controller configured to, based at least on receiving an indication of the power overload condition, transmit an instruction to one or more child controllers that causes each child controller to effect a change in an operational state of a corresponding power node. The computing system also comprises a conductive pathway along which electrical power output from the power supply is transmitted for delivery to the one or more power nodes, and along which the instruction is transmitted to the one or more child controllers.

17 Claims, 6 Drawing Sheets

(56) References Cited

U.S. PATENT DOCUMENTS

| | | | |
|---|---|---|---|
| 7,141,891 B2 | 11/2006 | Mcnally et al. | |
| 7,171,461 B2 | 1/2007 | Ewing et al. | |
| 7,402,892 B1 | 7/2008 | Glaser et al. | |
| 7,818,621 B2 | 10/2010 | Childress et al. | |
| 8,570,701 B2 | 10/2013 | Adomaitis et al. | |
| 8,638,008 B2 | 1/2014 | Baldwin et al. | |
| 9,043,002 B2 | 5/2015 | Longacre | |
| 9,292,056 B2 | 3/2016 | Watson | |
| 9,766,670 B1 | 9/2017 | Czamara et al. | |
| 10,228,744 B2 | 3/2019 | Bimie et al. | |
| 10,250,032 B2 | 4/2019 | Ferguson | |
| 11,429,176 B2* | 8/2022 | Gaikwad | G06F 16/906 |
| 2006/0197626 A1* | 9/2006 | Ehlers | G01R 27/04 |
| | | | 333/112 |
| 2009/0282274 A1 | 11/2009 | Langgood et al. | |
| 2011/0213997 A1* | 9/2011 | Kansal | G01R 21/133 |
| | | | 713/340 |
| 2011/0314318 A1* | 12/2011 | Sawai | G06F 11/2015 |
| | | | 713/340 |
| 2012/0054512 A1* | 3/2012 | Archibald | G06F 1/26 |
| | | | 713/320 |
| 2013/0070790 A1* | 3/2013 | Vedantham | H04B 3/54 |
| | | | 370/474 |
| 2013/0212411 A1 | 8/2013 | Nicholson et al. | |
| 2014/0136866 A1* | 5/2014 | Kuan | G06F 1/3296 |
| | | | 713/320 |
| 2014/0143578 A1* | 5/2014 | Cenizal | H02J 13/00 |
| | | | 713/340 |
| 2014/0344389 A1* | 11/2014 | Hsieh | G06F 13/362 |
| | | | 709/208 |
| 2016/0328010 A1* | 11/2016 | Cochran | G06F 1/30 |
| 2017/0139797 A1* | 5/2017 | Wang | G06F 13/364 |
| 2019/0121413 A1* | 4/2019 | Tsai | G06F 1/263 |
| 2019/0237916 A1* | 8/2019 | Siegler | H01H 89/00 |
| 2019/0361474 A1 | 11/2019 | Chapel et al. | |
| 2020/0081504 A1* | 3/2020 | Ou Yang | H02J 1/106 |
| 2020/0097057 A1* | 3/2020 | Tseng | H05K 7/1492 |
| 2020/0153230 A1 | 5/2020 | Atluri et al. | |
| 2020/0315054 A1* | 10/2020 | Shen | G06F 1/26 |
| 2021/0357016 A1* | 11/2021 | Gaikwad | G06F 16/906 |
| 2021/0397239 A1* | 12/2021 | Sethi | G06F 1/3296 |

OTHER PUBLICATIONS

Lefurgy, et al., "Server-Level Power Control-", In Proceedings of Fourth International Conference on Autonomic Computing, Jun. 11, 2007, 10 Pages.

Parise, et al., "Electrical Distribution for a Reliable Data Center", In Proceedings of IEEE Transactions on Industry Applications, vol. 49, Issue 4, Jul. 2013, pp. 1697-1702.

Shaji, et al., "An Optimized Server Load Balancing for Unstructured Networks Using SDN", In International Journal of Pure and Applied Mathematics, vol. 114, Issue 11, Apr. 27, 2017, pp. 167-176.

Louie, et al., "Discussion on Power Line Carrier Applications", In Proceedings of Canadian Conference on Electrical and Computer Engineering, May 7, 2006, pp. 655-658.

"International Search Report and Written Opinion Issued in PCT Application No. PCT/US22/027554", dated Aug. 1, 2022, 12 Pages.

\* cited by examiner

COMPUTING SYSTEM INCLUDING POWER NODES

BACKGROUND

In data centers and other computing environments, a portion of hardware and/or software resources may be dedicated to power delivery and monitoring to maintain operation and satisfy customer availability requirements. In some data centers, network and software resources may be used to identify power overload conditions, which may prompt the electrical disconnection of compute nodes and other hardware.

DETAILED DESCRIPTION

In data centers and other computing systems, a portion of hardware and/or software resources may be dedicated to power delivery and monitoring to maintain operation and satisfy customer availability requirements. In some data centers, network and software resources may be used to identify a power overload condition, such as one occurring at an uninterruptible power supply (UPS). Identification of the power overload condition may prompt the electrical disconnection of compute nodes and other hardware from the UPS, for example by tripping shunts arranged in racks housing the compute nodes and hardware. Prior to performing such electrical disconnection, an attempt may be made to redistribute compute workloads from the compute nodes powered by the UPS subject to the overload condition to other compute nodes. In such architectures that rely on the continued functioning of network and software resources to communicate power overload conditions and prompt appropriate action, however, degradation in network connectivity, software services, and/or general outages may result in a failure to communicate overload conditions and accordingly take action such as redistributing compute workloads. Data loss and a failure to satisfy customer availability requirements and service level agreements may result.

Accordingly, examples are disclosed that relate to computing systems in which a common conductive pathway is used to transmit current to nodes and indicate impending power overload conditions. In one example, a computing system comprises a power supply configured to output electrical power for delivery to one or more power nodes, and one or more power monitors configured to identify a power overload condition based on monitoring the electrical power output by the power supply. The computing system further comprises a parent controller, which may function as a centralized power management component that cooperates with child controllers that each manage the operational state of a power node responsive to communications from the parent controller—e.g., to mitigate the power overload conditions. More particularly, the parent controller is configured to, based at least on receiving an indication of the power overload condition, transmit an instruction to one or more child controllers that causes each child controller to effect a change in an operational state of a corresponding power node. The computing system also comprises a conductive pathway along which electrical power output from the power supply is transmitted for delivery to the one or more power nodes, and along which the instruction is transmitted to the one or more child controllers.

By employing a common conductive pathway both for the transmission of power to nodes and indications of power overload conditions, a more robust and reliable mechanism may be implemented to notify power nodes of such conditions and facilitate mitigating action. Further, leveraging a power delivery infrastructure to deliver data may reduce the amount of physical cabling in a data center or other facility implementing the computing system, rendering the installation and maintenance of cabling and other physical items in the facility easier. This may also facilitate retrofitting of existing systems to incorporate the features discussed herein. In contrast, other systems that use separate pathways for current delivery and notification of power overload conditions are subject to the possibility of data loss upon failure of the pathway used to communicate power overload conditions. Moreover, by notifying of an impending power overload condition—i.e., before the condition is met—nodes may be afforded the ability to take mitigating action and thereby avert data loss, violations of customer availability requirements, and service level agreements. As described below, a node may take various actions in response to being notified of a power overload condition, including but not limited to migrating compute workloads to other nodes that are not subject to the overload condition, and migrating workloads/shutting down according to workload priority.

Figure 1:
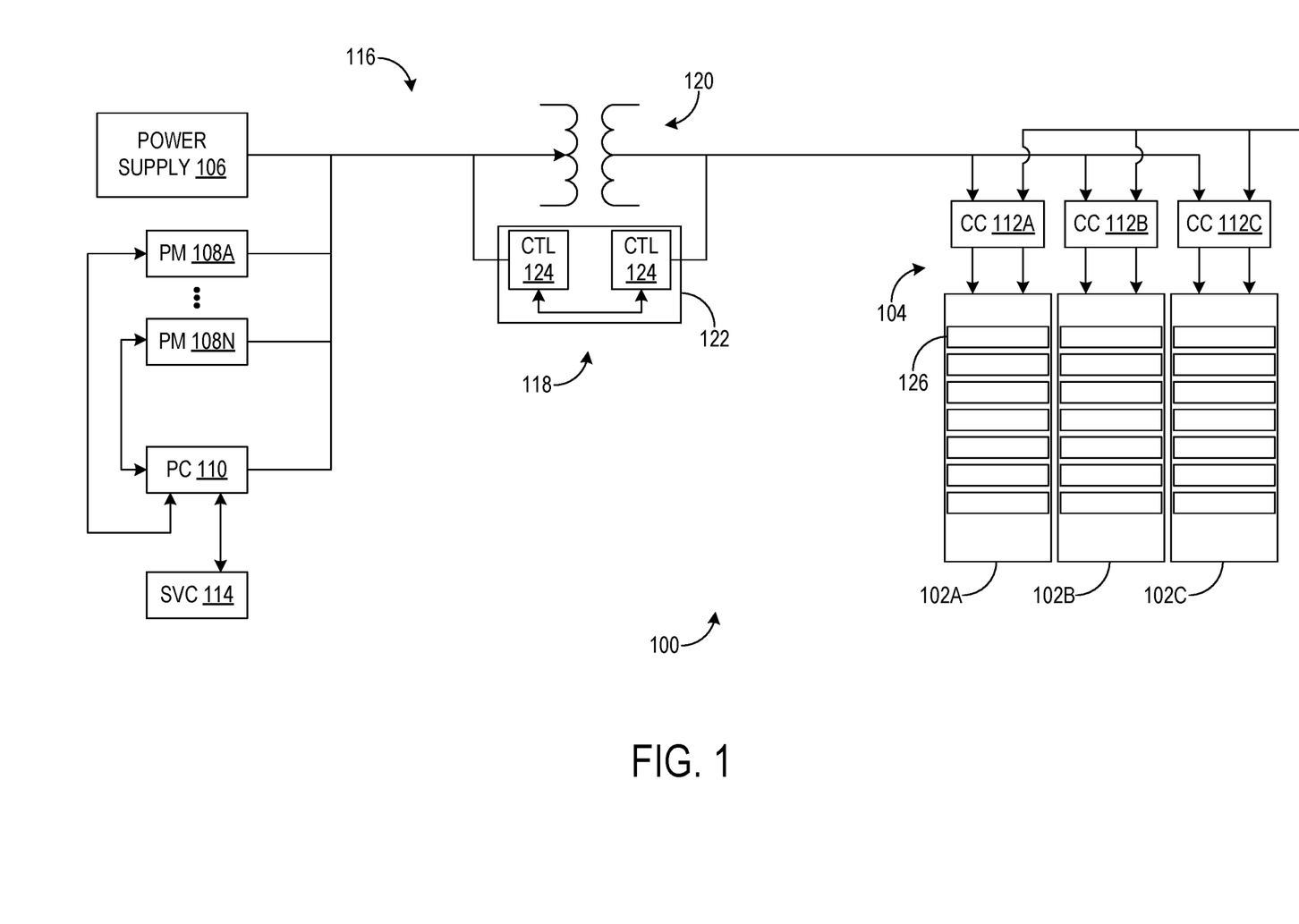
FIG. 1 schematically depicts an example computing system in which electrical current is delivered to a plurality of power nodes.

FIG. 1 schematically depicts an example computing system 100 in which electrical current is delivered to a plurality of power nodes 102. Each power node 102 includes various electronic components, including but not limited to computing devices (e.g., blade servers), storage devices (e.g., hard disks, solid state storage, tape storage), and/or networking devices (e.g., hubs, routers). One or more components in a power node 102 may thus be referred to as a compute, storage, and/or networking node, depending on their configuration. Each power node 102 may further include various power infrastructure components that distribute, manage, and/or perform other suitable functions relating to current delivery in the power node, including but not limited to whips, transformers, breakers, and fuses. In the example of FIG. 1, the components of each power node 102 are depicted as being arranged in a corresponding rack. However, each power node 102 and the components therein may be organized in any suitable physical and logical manner. In some examples, computing system 100 may form at least part of a data center. The data center may implement a distributed computing network that offers compute, storage, and/or network resources to clients through a cloud computing service, as a particular example.

Electrical current is delivered to each power node 102 via one or more power supplies. In the depicted example, each power node 102 receives current via dual connectors schematically indicated at 104, with each connector being supplied current by a respective power supply including a power supply 106. Power supply 106 may convert mains power in the form of alternating current to direct current that is delivered to power nodes 102. In some examples, power supply 106 may include a battery that may be used as a backup power source. Power supply 106 may assume the form of an uninterruptible power supply, for example, or any other suitable form. Any suitable type and number of power supplies may be used to supply current to power nodes 102, however, using any suitable connection scheme.

One or more power monitors 108 are configured to monitor electrical power output by power supply 106 to identify a power overload condition associated with the power supply. To this end, power monitors 108 may (e.g., on a substantially continuous basis) monitor aspects of the output power such as the instantaneous output current, a time-averaged measure of output current, a derivative of the output current (e.g., with respect to time), and/or any other suitable measure of electrical current. Power monitors 108 may observe other aspects of the output from power supply 106, however, such as voltage and/or frequency. Based on these and/or other potential measures of the output from power supply 106, power monitors 108 may identify a power overload condition associated with the power supply and transmit an indication (e.g., via alarm signals attached to dry contacts of the power monitors) of the power overload condition to a parent controller 110. As one example, a power overload condition may be identified upon recognizing that the magnitude of output current from power supply 106 exceeds a threshold magnitude for at least a threshold duration. As described below, parent controller 110 may communicate with downstream controllers of power nodes 102 to notify the controllers of the power overload condition and/or to instruct the controllers to adjust the operational state of the power nodes in view of the overload condition. In some examples, multiple power monitors 108 may be provided and configured with different criteria that triggers the indication of a power overload condition, which may help to avert false positives of the overload condition.

The power overload condition may be defined in any suitable manner. In some examples, the power overload condition may include an impending power overload condition that has not yet manifested. Accordingly, in such examples, detecting the power overload condition includes detecting an upcoming power overload condition that is not yet realized. As described in further detail below, this detection may afford power nodes 102 the ability to take mitigating action, such as transferring compute workloads to compute nodes provided at other power nodes not subject to the power overload condition, before the supply of power is cut off to the power nodes 102 to resolve the overload condition. However, examples are possible in which the power overload condition is defined as, and its detection includes, a current power overload condition, alternatively or in addition to an impending overload condition.

A power overload condition associated with the output current from power supply 106 may arise from a variety of factors. As one example, a power overload condition may occur upon a power node 102 drawing an amount of electrical current greater than a threshold amount—e.g., as a result of compute workloads executing on compute nodes at the power node. As a result, the amount of power available to other power nodes 102 may be reduced. In another example, a power supply among multiple power supplies providing current to a common power node 102 may degrade, causing the electrical load from the degraded power supply to be redistributed to the other power supplies, resulting in overload conditions at one or more of the other power supplies.

As noted above, parent controller 110 may receive an indication of a power overload condition from one or more power monitors 108. In response to receiving this indication, parent controller 110 may transmit an instruction to one or more child controllers 112 that causes the child controllers to effect a change in the operational state of corresponding power nodes 102 and thereby attempt to resolve the overload condition—e.g., without cutting power to the power nodes. Parent controller 110 may also set a timer in response to detecting the overload condition. Upon expiration of the timer, parent controller 110 may determine whether the overload condition is resolved. If the overload condition is not resolved, parent controller 110 may transmit an instruction to one or more child controllers 112 to cut power to power nodes 102. Detail regarding child controllers 112 and the transmission of instructions from parent controller 110 is described below. As described below, parent controller 110 and child controllers 112 may implement one or more of a logic subsystem, storage subsystem, and communication subsystem to effect the functionality described herein. Detail regarding example subsystems that may be implemented by parent controller 110 and child controllers 112 is described below with reference to FIG. 6.

It will be understood that "instruction" as used herein may refer to data that directs or otherwise directly effects an action, such as parent controller 110 commanding child controllers 112 to take mitigating action before power supply is cut. "Instruction" alternatively or additionally may refer to data that provides an awareness of a power overload or other condition, in which case recipients of the instruction such as child controllers 112 may determine appropriate action to take in response to the instruction.

In some examples, a service 114 external to child controllers 112 may attempt to resolve the power overload condition—e.g., before expiration of the timer. Service 114 is depicted as being communicatively coupled to parent controller 110 to thereby receive indications of power overload conditions, but it may be notified of such conditions in any suitable manner. Upon being notified of the overload condition, service 114 may issue an instruction to one or more power nodes 102 to reduce their load. In some examples, the instruction may be broadcast to all power nodes 102 with a general instruction to reduce load without identifying specific nodes, components therein, or workloads to target for load reduction. Service 114 may communicate with power nodes 102 in any suitable manner. As one example, service 114 may issue instructions to reduce load at power nodes 102, through a network connection (not shown), to networking devices (e.g., routers, hubs) arranged at the power nodes. Further, service 114 may be implemented in any suitable manner. As an example, service 114 may be implemented as a software service executed on compute node(s) that are fed current by a power delivery system other than that formed by the power supplies feeding current to power nodes 102.

Following the attempt by service 114 to resolve the power overload condition, a determination may be made (e.g., by parent controller 110) whether the load at power nodes 102 has been sufficiently reduced to resolve the overload condition. Where the load has been sufficiently reduced, parent controller 110 may take no further action other than clearing—directly or indirectly—the overload condition. Where the load instead has not been sufficiently reduced, parent controller 110 may issue an instruction to one or more child controllers 112 to take mitigating action, such as redistributing workloads to other power nodes unaffected by the overload condition, before power is cut to power nodes 102 as described below.

In the example of FIG. 1, the transmission of instructions from parent controller 110 to child controllers 112, and the delivery of electrical current from power supply 106 to power nodes 102, may occur along a common conductive pathway schematically indicated at 116. More particularly, instruction transmission and current delivery may occur along a common set of one or more conductors, such as conductive wires arranged in cabling (e.g., power cabling). Accordingly, components that form the power delivery infrastructure in computing system 100 may be leveraged for powerline data transmission, thereby enabling the omission of cabling or other conductive pathways that would otherwise be provided for data transmission. Further, conductive pathway 116 may provide a more resilient mechanism of communicating overload conditions as compared to implementations in which a separate pathway (e.g., network pathway) is provided for communicating data, as the degradation of such a pathway renders the pathway unable to communicate overload conditions.

Data transmission and current delivery may be combined in conductive pathway 116 in any suitable manner. In some examples, parent controller 110 is configured to inject signals encoding data (e.g., indications of power overload conditions, instructions to child controllers 112) at a frequency different (e.g., higher) than the frequency at which current is transmitted along conductive pathway 116. However, power delivery infrastructure components between parent controller 110 and child controllers 112 may, in certain configurations, substantially block the transmission of data along conductive pathway 116. As one example, FIG. 1 depicts a power distribution unit (PDU) 118 arranged between power supply 106 and power nodes 102 that includes a transformer 120. PDU 118 may include other components and/or perform functions other than transforming voltages, such as power cooling and/or monitoring. Inductance produced by transformer 120 may substantially block frequencies at which data is transmitted along conductive pathway 116. Accordingly, a bridge 122 may be arranged across transformer 120 to provide an alternative pathway along which data transmitted in conductive pathway 116 is picked off (at an input side) and reinjected (at an output side) into the electrical current in the conductive pathway. Bridge 122 includes two bridge controllers 124 communicatively coupled together (e.g., via an Ethernet link). In some examples, parent controller 110 and bridge controllers 124 may have a common hardware configuration. Example implementations of parent controller 110 and bridge controllers 124 are described below with reference to FIGS. 2 and 3, respectively.

It will be understood that data may be transmitted in computing system 100, including instructions from parent controller 110 and/or other data, via any suitable mechanism. Examples mechanisms include, alternatively or in addition to conductive pathway 116, wired Ethernet, wireless Ethernet, coaxial cable, phone line, and optical fiber mechanisms. Further, in some examples, conductive pathway 116 may perform alternative or additional functions other than delivering power to power nodes 102 and data to child controllers 112. Other functions may relate to cooling, lighting, fire suppression, and alarms, as examples. In such examples, conductive pathway 116 may be configured at least for power and data transmission.

Instructions transmitted by parent controller 110 to child controllers 112 may cause any suitable action(s) to be taken at power nodes 102 to resolve a power overload condition before power is cut to the power nodes. Such actions may include transferring workloads (e.g., compute workloads) from power nodes 102 to other power nodes unaffected by the overload condition, such as power nodes provided at another data center and/or powered by a different power delivery system. Actions may further include capturing a snapshot of data, such as client data or the state of an executing workload. Snapshots may be saves at non-volatile storage device(s) at power nodes 102 and/or transmitted to other power nodes unaffected by the overload condition for storage at the unaffected nodes, for example. Further actions may include adjusting the priority of a workload and/or adjusting compute/storage/network resources allocated to a workload, client or application.

In some examples, instructions transmitted by parent controller 110 along conductive pathway 116 may be relayed to software executing at power nodes 102. Such instructions may cause any suitable software-related actions at power nodes 102, such as saving data snapshots and/or adjusting application or workload state. Instructions may be relayed to software executing at power nodes 102 via rack managers provided at each power node 102, for example. FIG. 1 illustrates one such implementation in which a rack manager 126 is provided at power node 102A, through which instructions may be relayed to software executing at the power node. Rack manager 126 may be configured to receive instructions communicated along conductive pathway 116, for example, to which end the rack manager may include corresponding inputs and outputs.

In some examples, instructions transmitted by parent controller 110 to effect changes in the operational states of power nodes 102 may be broadcast to all power nodes in computing system 100. In other examples, instructions transmitted by parent controller 110 may be transmitted to select power nodes 102. In such examples, child controllers 112 may be installed at every power node 102 to enable the selective control of individual power nodes. Select power nodes 102 may be identified and transmitted to via identifiers assigned to each power node, such as media access control (MAC) addresses.

In some examples, parent controller 110 may transmit instructions to child controllers 112 according to priorities associated with power nodes 102. For example, parent controller 110 may communicate with service 114 to obtain priority levels associated with power nodes 102 and/or hardware and/or software components therein, such as priority levels assigned to workloads, applications, compute nodes, or users. In some examples, priority levels obtained via service 114 may lead to the transmission of instructions from parent controller 110 to a selected subset of child controllers 112, such that one or more child controllers do not receive instructions from parent controller 110. As one example, power nodes 102 associated with a highest or mission-critical priority level may be excluded from receiving instructions to retain their operation, while power nodes associated with a lowest or uncritical priority level may be prioritized to receive instructions to take mitigating action before power supply is cut. Alternatively or in addition to using priority levels for selective instruction transmission, priority levels may be used to affect the timing of instruction transmission. For example, parent controller 110 may transmit instructions to child controllers 112 associated with power nodes 102 to which a highest or mission-critical priority is assigned before transmitting instructions to other child controllers associated with power nodes to which a relatively lower priority is assigned. It will be understood that priority levels may be determined in any suitable manner, such as on the basis of service level agreements, client availability requirements, and/or quality-of-service.

As described above, parent controller 110 may set a timer upon receiving an indication of a power overload condition. Upon setting the timer, or during pendency of the timer, parent controller 110 may transmit an instruction to one or more child controllers 112 to effect a change in the operational state of their corresponding power nodes 102 before power is cut to the power nodes. Upon expiry of the timer, parent controller 110 may determine whether the load at power nodes 102 has been sufficiently reduced to resolve the overload condition. This determination may be made based on observing the output of power supply 106 as described above. Where the load instead has not been sufficiently reduced—e.g., due to an inability to transfer compute workloads or the occurrence of an event that delays load reduction—parent controller 110 may transmit an instruction to one or more child controllers 112 to cause power to be cut to selected power nodes 102. In this sense, setting of the timer and providing associated instructions may be thought of as a preliminary notification that more severe/aggressive countermeasures will soon occur if the overload condition does not resolve. In such a case of the condition not resolving, each child controller 112 may cut power to its corresponding power node 102 by actuating a shunt that opens a power supply circuit and thereby cuts power to the components in that power node, as one example. While selected power nodes 102 may be shut down, other power nodes in computing system 100 may remain powered and operational, which may enable the computing system to continue operation even in the event of power overload conditions and resultant power node power-down.

In some examples, one or more child controllers 112 may be configured with the ability to selectively respond to instructions transmitted by parent controller 110. In such examples, a child controller 112 may be deactivated from responding to instructions from parent controller 110, in which case the operational state of its corresponding power node 102 is not adjusted in response to a power overload condition. Where this functionality is deactivated at a child controller 112, the functionality may be reenabled, for example in response to a changing priority level associated with its corresponding power node 102.

In some examples, the duration of the timer set by parent controller 110 in response to being notified of a power overload condition may be variable. The timer may differ in view of the configuration of computing system 100—e.g., the configuration of power nodes 102, current consumption by components in power nodes, capabilities of power supply 106. As such, different timers may be established for different physical implementations of computing system 100. Moreover, the variability of the timer may be a function of a relationship between a power overload condition and the electrical load associated with the overload condition. According to this relationship, as this load is reduced, the time until the power overload condition is realized—e.g., at which point power is cut to power nodes 102—increases. As such, the timer may be extended as electrical load is reduced. Further, in some examples, parent controller 110 may start a secondary timer, for example where the duration until a power overload condition manifests is extended. The secondary timer may afford power nodes 102 an extended ability to take mitigating action before power is cut in view of the extra time available to take such action.

Where power is cut to a power node 102, power may be restored to the power node in any suitable manner. For example, a physical button (e.g., provided at parent controller 110) may be manually actuated to restore power. In other examples, a software mechanism may be used to issue a turn-on command to parent controller 110. The command may be issued manually by human operators, or through facility monitoring systems that detect power system health and have the ability to automatically restore power node power, as examples.

In some examples, where a child controller 112 is unable to communicate with parent controller 110, the child controller may be configured to keep its corresponding power node 102 in a powered state. In such examples, child controller 112 may not cut power to the corresponding power node 102 unless an instruction is received from parent controller 110 to cut power. In this way, false shutdowns may be avoided for scenarios where communication between parent and child controller is lost, yet a power overload condition meriting power node shutdown does not exist.

Figure 2:
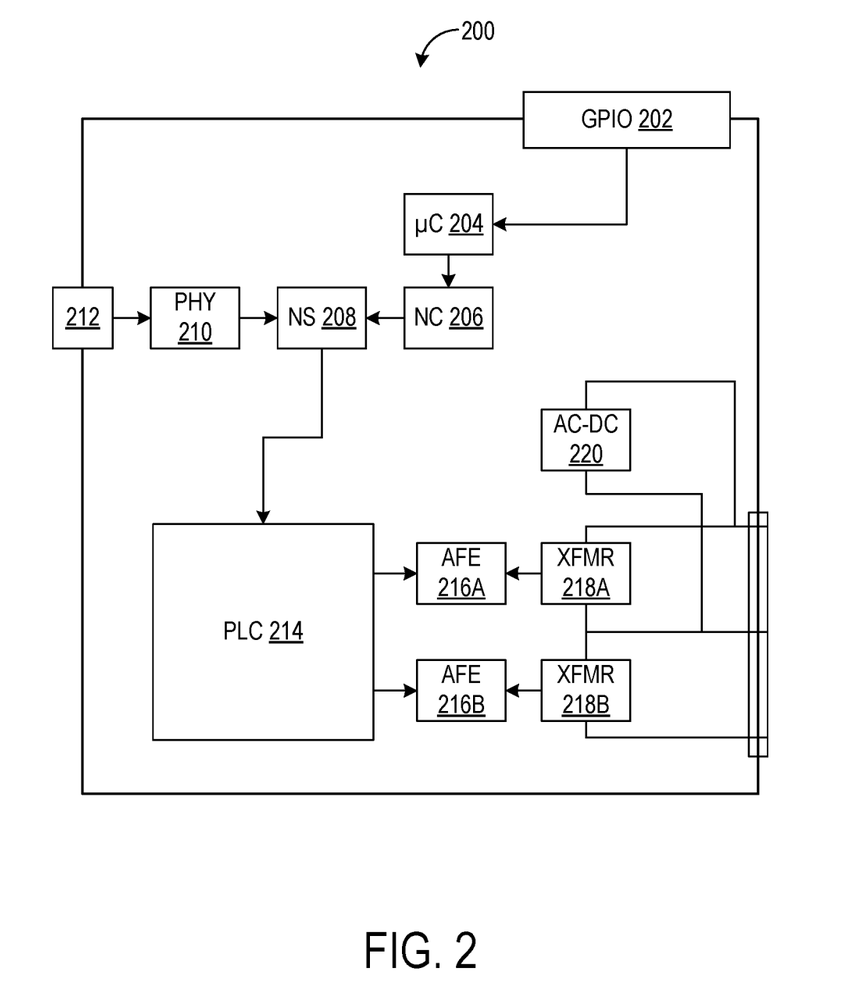
FIG. 2 depicts an example implementation of a parent controller.

FIG. 2 shows an example implementation of a parent controller 200. Parent controller 110 may implement aspects of parent controller 200, for example. Controller 200 includes a general purpose input/output (GPIO) interface 202 with which indications of power overload conditions may be received from power monitors 108. Interface 202 is coupled to a microcontroller 204, which may be configured to register power overload conditions. Microcontroller 204 is coupled to a network controller 206, which is in turn coupled to a network switch 208, which is in turn coupled to a network physical layer 210. Layer 210 is coupled to a port 212 for the purpose of external reporting (e.g., to service 114). Network components 206, 208, and 210 may take any suitable form. As one example, network components 206, 208, and 210 may be configured to communicate over an Ethernet network, in which case network controller 206 may be an Ethernet controller, and network switch 208 may be an Ethernet switch.

Controller 200 further includes a powerline communication device 214 configured to inject data signals into power transmissions such as those carried along conductive pathway 116. In the depicted example, device 214 is coupled to two analog front ends (AFEs) 216 and to two coupling transformers 218, but may employ any suitable number of analog front ends and transformers. Device 214, front ends 216, coupling transformers 218, and a power conversion device 220 cooperate to perform up-conversion and capacitive isolation in service of injecting data signals onto power transmissions. In this example, power conversion device 220 utilizes line power without an auxiliary or backup power input.

Figure 3:
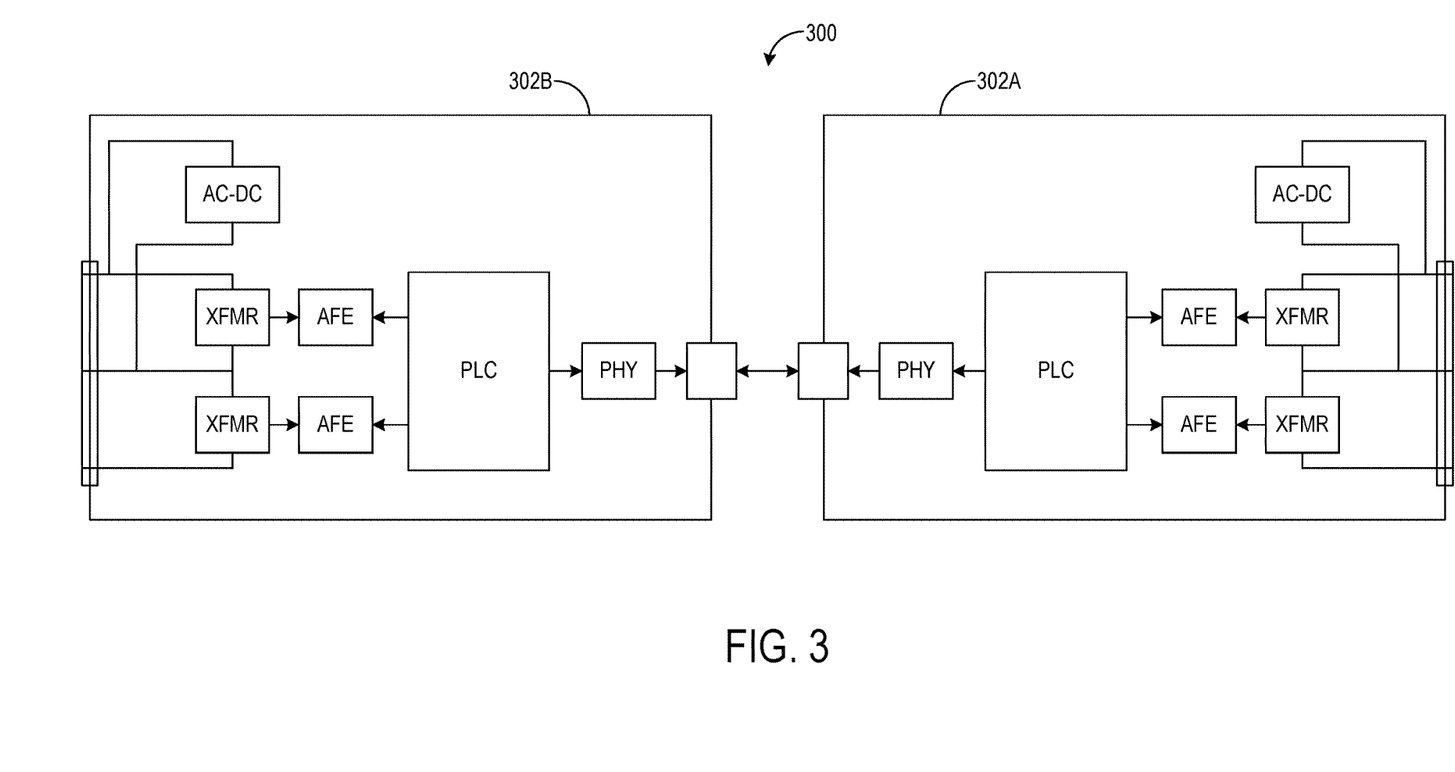
FIG. 3 depicts an example implementation of a bridge.

FIG. 3 depicts an example implementation of a bridge 300 as mentioned previously. Previously notes bridge 122 may implement aspects of bridge 300, for example. As such, bridge 300 may be used to provide a data pathway around power infrastructure components that substantially block data transmission. Bridge 300 includes two controllers 302A and 302B that are communicatively coupled together. Each controller 302 may implement aspects of controller 200, for example. As such, the function and configuration of each controller 302 may be understood from the description of FIG. 2. While not depicted, each controller 302 may include a microcontroller, for example for the purpose of health monitoring.

Figure 4:
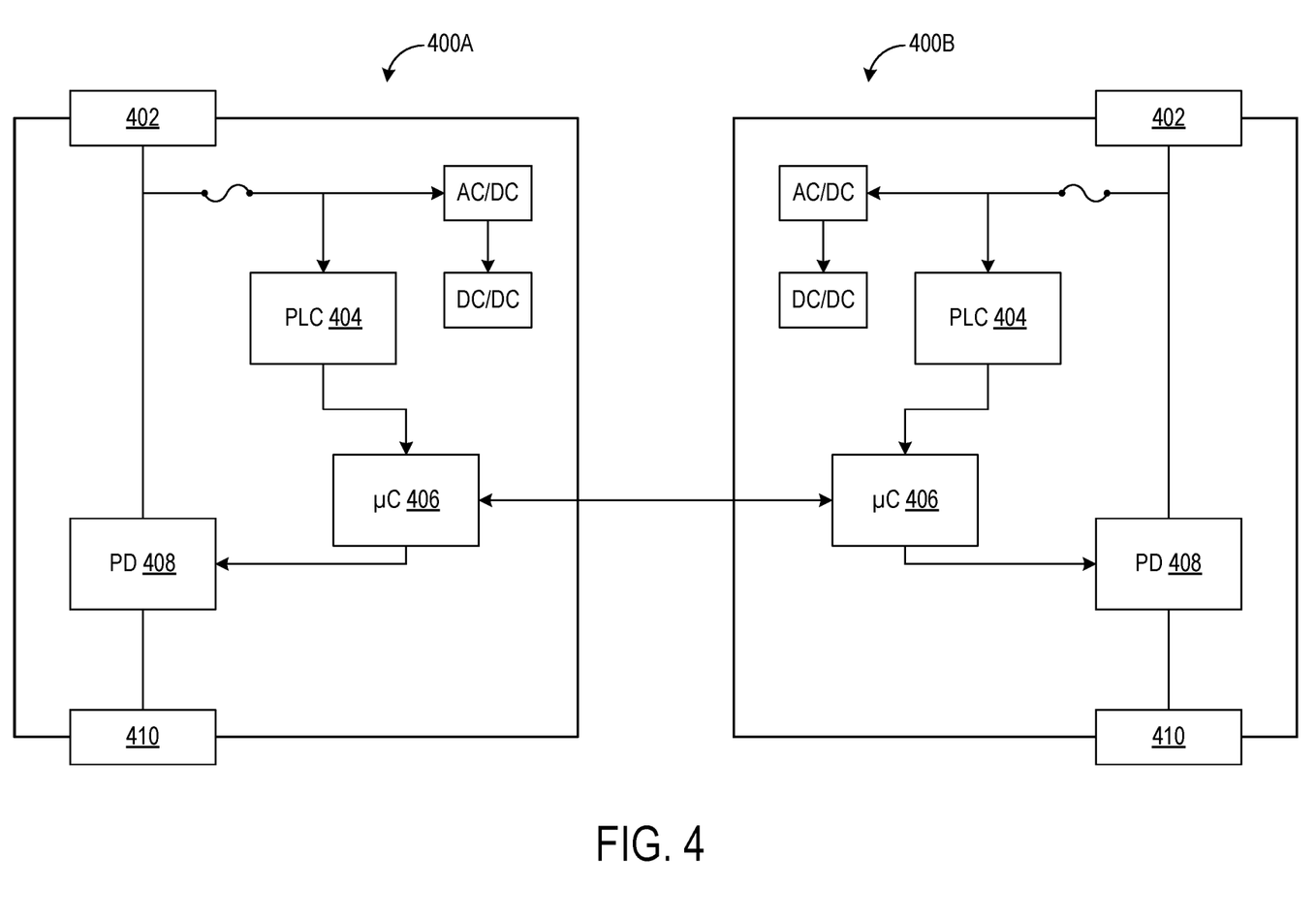
FIG. 4 depicts an example implementation of two child controllers that are communicatively coupled.

FIG. 4 depicts an example implementation of two child controllers 400 that are communicatively coupled. Child controllers 112 may implement aspects of child controllers 400, for example. The depicted example illustrates an implementation that includes multiple child controllers 400 each having a single power input 402, but other implementations are possible in which a single child controller 400 is provided that includes dual power inputs. Each controller 400 includes a powerline communication device 404 coupled to a microcontroller 406. Upon receiving an instruction (e.g., from parent controller 110) to cut power to a power node, each controller 400 may, via microcontroller 406, instruct a power disconnect 408 (e.g., shunt) to open, thereby cutting power to a power outlet 410 and thus to the corresponding power node. Further, controllers 400 are depicted as being communicatively coupled via microcontrollers 406 to synchronize operation between the controllers, such that cutting power at one controller effects cutting power at the other controller. Microcontrollers 406 may be used for other purposes, including but not limited to sending health and monitoring telemetry, and collecting sensor data (e.g., regarding feed voltages). Controllers 400 may implemented in whips provided at power nodes 102, or as a tap box off a busway, as examples.

The examples described herein may enable targeted and flexible management of power overload conditions, including scenarios in which power overload conditions are averted (e.g., through workload redistribution) and scenarios in which power node shutdown occurs but is minimized to potentially retain computing system operation. As such, data preservation and customer availability requirements may be maintained. These and other potential advantages may be achieved through a consolidated communication and current delivery pathway, reducing infrastructure, complexity, and management in a computing system.

Figure 5:
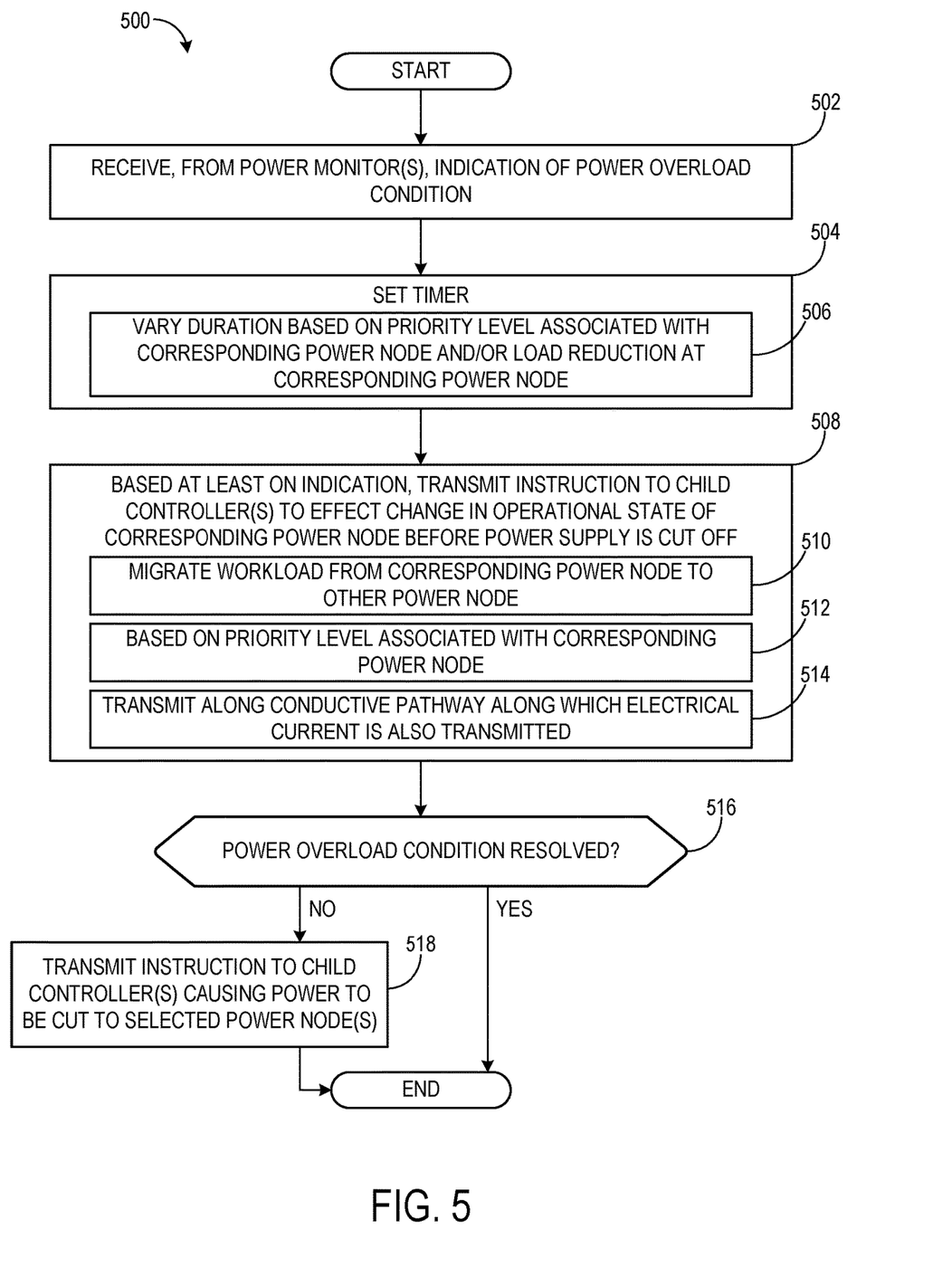
FIG. 5 depicts a flowchart illustrating an example method of managing a power overload condition.

FIG. 5 depicts a flowchart illustrating a method 500 of managing a power overload condition. Method 500 may be implemented at least in part at parent controller 110, for example.

At 502, method 500 includes receiving, from one or more power monitors, an indication of a power overload condition. At 504, method 500 includes setting a timer. The duration of the timer may be varied 506 based on one or more of a priority level associated with the corresponding power node, and a reduction of a load at the corresponding power node.

At 508, method 500 includes, based at least on receiving the indication of the power overload condition, transmitting an instruction to one or more child controllers that causes each child controller to effect a change in an operational state of a corresponding power node before power supply to the corresponding power node from one or more power supplies is cut off. The change in the operational state may include migrating 510 a workload executing at the corresponding power node to one or more other power nodes. The change in the operational state may be effected based on a priority level 512 associated with the corresponding power node. The instruction may be transmitted 514 along a conductive pathway along which electrical current output by the one or more power supplies is also transmitted.

At 516, method 500 includes determining whether the power overload condition is resolved. If the power overload condition is resolved (i.e., no longer exists), method 500 ends. If the power overload condition is not resolved (i.e., still exists), method 500 proceeds to 518 at which an instruction is transmitted to the one or more child controllers causing power to be cut to one or more selected power nodes.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
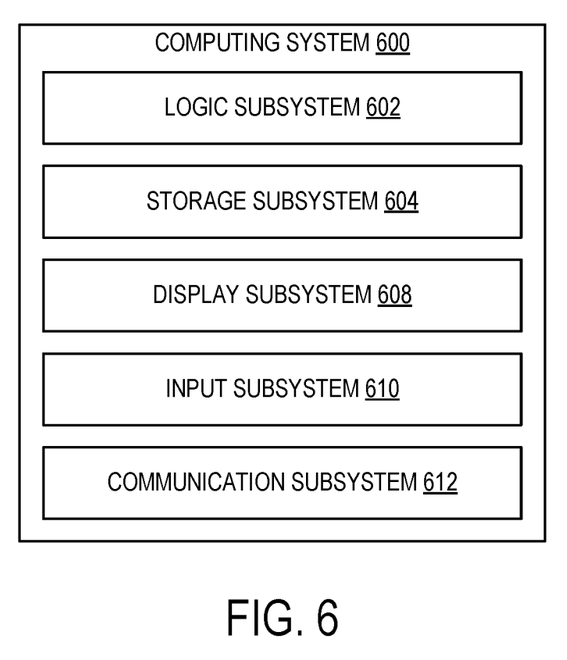
FIG. 6 schematically depicts a block diagram of an example computing system.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic subsystem 602 and a storage subsystem 604. Computing system 600 may optionally include a display subsystem 608, input subsystem 610, communication subsystem 612, and/or other components not shown in FIG. 6.

Logic subsystem 602 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic machines configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 604 includes one or more physical devices configured to hold instructions executable by the logic subsystem to implement the methods and processes described herein. When such methods and processes are implemented, the state of storage subsystem 604 may be transformed—e.g., to hold different data.

Storage subsystem 604 may include removable and/or built-in devices. Storage subsystem 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 604 may include volatile, nonvolatile, dynamic, static, read/write, read-only, random-access, sequential-access, location-addressable, file-addressable, and/or content-addressable devices.

It will be appreciated that storage subsystem 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 602 and storage subsystem 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic subsystem 602 executing instructions held by storage subsystem 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 608 may be used to present a visual representation of data held by storage subsystem 604. This visual representation may take the form of a graphical user interface (GUI). As the herein described methods and processes change the data held by the storage subsystem, and thus transform the state of the storage subsystem, the state of display subsystem 608 may likewise be transformed to visually represent changes in the underlying data. Display subsystem 608 may include one or more display devices utilizing virtually any type of technology. Such display devices may be combined with logic subsystem 602 and/or storage subsystem 604 in a shared enclosure, or such display devices may be peripheral display devices.

When included, input subsystem 610 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 612 may be configured to communicatively couple computing system 600 with one or more other computing devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

Another example provides a computing system, comprising a power supply configured to output electrical power for delivery to one or more power nodes, one or more power monitors configured to identify a power overload condition based on monitoring the electrical power output by the power supply, a parent controller configured to, based at least on receiving an indication of the power overload condition, transmit an instruction to one or more child controllers that causes each child controller to effect a change in an operational state of a corresponding power node, and a conductive pathway at least along which electrical power output from the power supply is transmitted for delivery to the one or more power nodes, and along which the instruction is transmitted to the one or more child controllers. In some such examples, the change in the operational state of the corresponding power node includes migrating a workload executing at the corresponding power node to one or more other power nodes. In some such examples, the change in the operational state of the corresponding power node alternatively or additionally is effected based on a priority level associated with the corresponding power node. In some such examples, the conductive pathway includes one or more conductors at least along which electrical power is delivered to the one or more power nodes, and along which the instruction is transmitted to the one or more child controllers. In some such examples, the conductive pathway alternatively or additionally includes a transformer, and the computing system further comprises a bridge configured to provide a data transmission pathway around the transformer via which the instruction is transmitted. In some such examples, the parent controller is a first parent controller, and the bridge alternatively or additionally includes a second parent controller communicatively coupled to a third parent controller. In some such examples, the parent controller alternatively or additionally includes a powerline communication device configured to inject the instruction into electrical power transmissions along the conductive pathway. In some such examples, the parent controller alternatively or additionally is configured to, in response to at least receiving the indication of the power overload condition, set a timer, transmit the instruction to the one or more child controllers, the instruction causing each child controller to effect, during pendency of the timer, the change in the operational state of the corresponding power node without cutting power to the corresponding power node, upon expiry of the timer, determine whether the power overload condition is resolved, and where the power overload condition is not resolved, transmit an instruction to the one or more child controllers causing power to be cut to one or more selected power nodes. In some such examples, the timer is variable.

Another example provides at a parent controller in a computing system, a method, comprising receiving, from one or more power monitors, an indication of a power overload condition, and based at least on receiving the indication of the power overload condition, transmitting an instruction to one or more child controllers that causes each child controller to effect a change in an operational state of a corresponding power node before power supply to the corresponding power node from one or more power supplies is cut off. In some such examples, the change in the operational state of the corresponding power node includes migrating a workload executing at the corresponding power node to one or more other power nodes. In some such examples, the change in the operational state of the corresponding power node alternatively or additionally is effected based on a priority level associated with the corresponding power node. In some such examples, the instruction is transmitted along a conductive pathway at least along which electrical power output by the one or more power supplies is also transmitted. In some such examples, the method alternatively or additionally comprises, in response to at least receiving the indication of the power overload condition, setting a timer, transmitting the instruction to the one or more child controllers, the instruction causing each child controller to effect, during pendency of the timer, the change in the operational state of the corresponding power node without cutting power to the corresponding power node, upon expiry of the timer, determining whether the power overload condition is resolved, and where the power overload condition is not resolved, transmitting an instruction to the one or more child controllers causing power to be cut to one or more selected power nodes. In some such examples, the method alternatively or additionally comprises varying a duration of the timer based on one or more of a priority level associated with the corresponding power node, and a reduction of a load at the corresponding power node.

Another example provides a parent controller, comprising a logic subsystem, a communication subsystem, and a storage subsystem comprising instructions executable by the logic subsystem to receive, via the communication subsystem, from one or more power monitors, an indication of a power overload condition, and based at least on receiving the indication of the power overload condition, transmit, via the communication subsystem, an instruction to a plurality of child controllers each coupled to a corresponding power node, the instruction causing each child controller to effect a change in an operational state of the corresponding power node before power supply to the corresponding power node from one or more power supplies is cut off. In some such examples, the change in the operational state of the corresponding power node includes migrating a workload executing at the corresponding power node to one or more other power nodes. In some such examples, the instruction is transmitted along a conductive pathway at least along which electrical power output by the one or more power supplies is also transmitted. In some such examples, the communication subsystem includes a powerline communication device configured to inject the instruction into electrical current transmissions along the conductive pathway. In some such examples, the parent controller alternatively or additionally comprises instructions executable to, in response to at least receiving the indication of the power overload condition, set a timer, transmit the instruction to the plurality of child controllers, upon expiry of the timer, determine whether the power overload condition is resolved, and where the power overload condition is not resolved, transmit an instruction to the plurality of child controllers causing power to be cut to one or more selected power nodes.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
 a power supply configured to output electrical power for delivery to one or more power nodes;
 one or more power monitors configured to identify a power overload condition based on monitoring the electrical power output by the power supply;
 a parent controller configured to, based at least on receiving an indication of the power overload condition, transmit an instruction to one or more child controllers that causes each child controller to effect a change in an operational state of a corresponding power node;
 a conductive pathway, comprising at least a transformer, at least along which electrical power output from the power supply is transmitted for delivery to the one or more power nodes, and along which the instruction is transmitted to the one or more child controllers; and
 a bridge configured to provide a data transmission pathway around the transformer via which the instruction is transmitted.

2. The computing system of claim 1, where the change in the operational state of the corresponding power node includes migrating a workload executing at the corresponding power node to one or more other power nodes.

3. The computing system of claim 1, where the change in the operational state of the corresponding power node is effected based on a priority level associated with the corresponding power node.

4. The computing system of claim 1, where the conductive pathway includes one or more conductors at least along which electrical power is delivered to the one or more power nodes, and along which the instruction is transmitted to the one or more child controllers.

5. The computing system of claim 1, where the parent controller is a first parent controller, and where the bridge includes a second parent controller communicatively coupled to a third parent controller.

6. The computing system of claim 1, where the parent controller includes a powerline communication device configured to inject the instruction into electrical power transmissions along the conductive pathway.

7. The computing system of claim 1, where the parent controller is further configured to:
 in response to at least receiving the indication of the power overload condition, set a timer;
 transmit the instruction to the one or more child controllers, the instruction causing each child controller to effect, during pendency of the timer, the change in the operational state of the corresponding power node without cutting power to the corresponding power node;
 upon expiry of the timer, determine whether the power overload condition is resolved; and
 where the power overload condition is not resolved, transmit an instruction to the one or more child controllers causing power to be cut to one or more selected power nodes.

8. The computing system of claim 7, wherein the timer is variable.

9. At a parent controller in a computing system, a method, comprising:
 receiving, from one or more power monitors, an indication of a power overload condition;
 based at least on receiving the indication of the power overload condition, transmitting an instruction to one or more child controllers that causes each child controller to effect a change in an operational state of a corresponding power node before power supply to the corresponding power node from one or more power supplies is cut off;

in response to at least receiving the indication of the power overload condition, setting a timer;

transmitting the instruction to the one or more child controllers, the instruction causing each child controller to effect, during pendency of the timer, the change in the operational state of the corresponding power node without cutting power to the corresponding power node;

upon expiry of the timer, determining whether the power overload condition is resolved; and where the power overload condition is not resolved, transmitting an instruction to the one or more child controllers causing power to be cut to one or more selected power nodes.

10. The method of claim 9, where the change in the operational state of the corresponding power node includes migrating a workload executing at the corresponding power node to one or more other power nodes.

11. The method of claim 9, where the change in the operational state of the corresponding power node is effected based on a priority level associated with the corresponding power node.

12. The method of claim 9, where the instruction is transmitted along a conductive pathway at least along which electrical power output by the one or more power supplies is also transmitted.

13. The method of claim 9, further comprising varying a duration of the timer based on one or more of a priority level associated with the corresponding power node, and a reduction of a load at the corresponding power node.

14. A parent controller, comprising:
a logic subsystem;
a communication subsystem; and
a storage subsystem comprising instructions executable by the logic subsystem to:

receive, via the communication subsystem, from one or more power monitors, an indication of a power overload condition;

based at least on receiving the indication of the power overload condition, transmit, via the communication subsystem, an instruction to a plurality of child controllers each coupled to a corresponding power node, the instruction causing each child controller to effect a change in an operational state of the corresponding power node before power supply to the corresponding power node from one or more power supplies is cut off;

in response to at least receiving the indication of the power overload condition, set a timer;

transmit the instruction to the plurality of child controllers;

upon expiry of the timer, determine whether the power overload condition is resolved; and where the power overload condition is not resolved, transmit an instruction to the plurality of child controllers causing power to be cut to one or more selected power nodes.

15. The parent controller of claim 14, where the change in the operational state of the corresponding power node includes migrating a workload executing at the corresponding power node to one or more other power nodes.

16. The parent controller of claim 14, where the instruction is transmitted along a conductive pathway at least along which electrical power output by the one or more power supplies is also transmitted.

17. The parent controller of claim 14, where the communication subsystem includes a powerline communication device configured to inject the instruction into electrical current transmissions along the conductive pathway.

* * * * *